April 29, 1958  W. RANZENBERGER  2,832,674
REACTION TANK
Filed Aug. 23, 1954
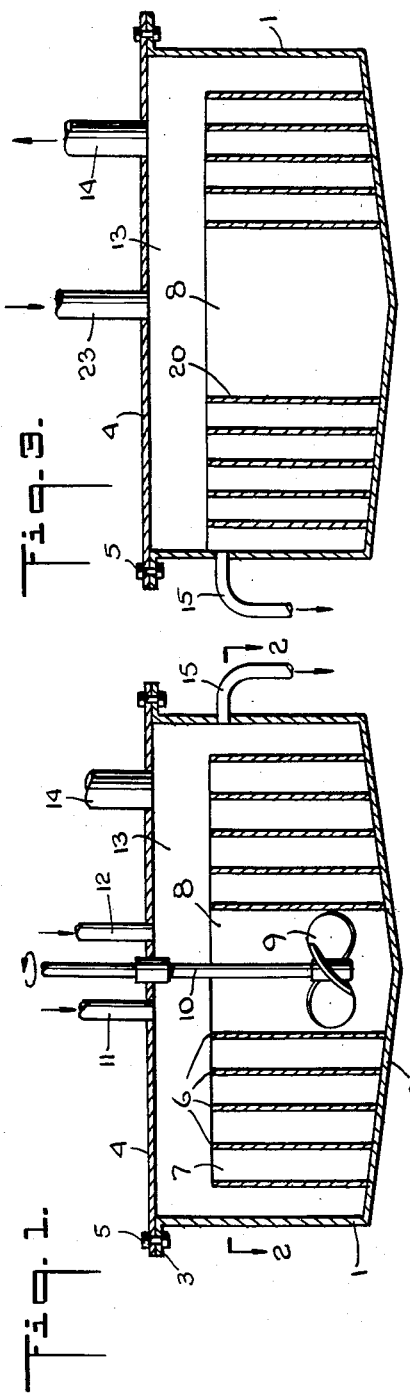
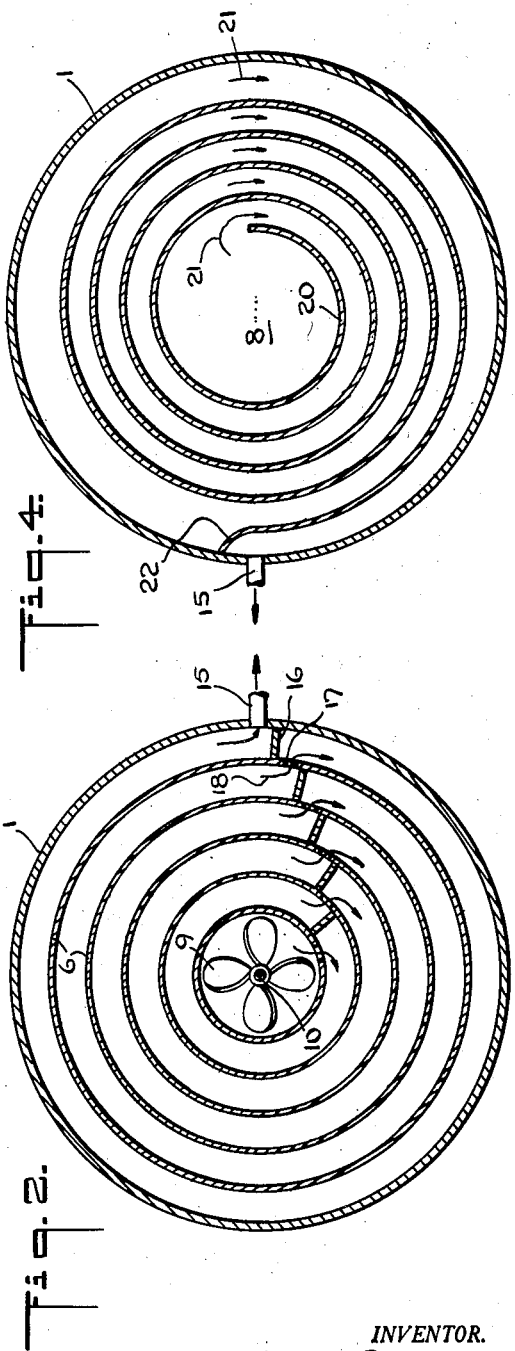
INVENTOR.
WALTHER RANZENBERGER
BY
ATTORNEY

# United States Patent Office 2,832,674
Patented Apr. 29, 1958

2,832,674

REACTION TANK

Walther Ranzenberger, Sao Paulo, Brazil, assignor to E. F. Drew & Company, Inc., a corporation of Delaware Application August 23, 1954, Serial No. 451,376

2 Claims. (Cl. 23—285)

This invention relates to an apparatus for the performance of continuous chemical reactions, in which one or several of the reaction components are introduced and/or removed during the reaction, consisting of a partly filled flow channel.

Chemical processes in which one or several partners of the reaction are introduced or removed during the process, like esterifications, interesterifications, aminolysis, as well as condensations and similar reactions, are commonly executed discontinuously even on a very large scale, since the introduction and/or removal of reaction partners can be accomplished in the simplest way using a reaction kettle. As far as continuous processes are concerned, the cascade system is used, which however is not completely satisfactory. Since such processes often are time reactions, and since the maintenance of well-defined reaction conditions is essential for the quality of the manufactured products, continuous processing is very advantageous.

The flow tube is a suitable apparatus for the reaction of homogeneous liquids because it grants equal residence time and permits the precise control of reaction conditions at every stage. But it cannot be used when heterogeneous liquids are reacted or when partners of the reaction have to be removed or introduced during the process. The cascade can be considered as a transition from the batch system to continuous work. It allows the removal as well as the introduction of reaction partners during the process, the choice of different reaction conditions in each stage, but the residence time is very unequal and therefore it is not possible to maintain optimum reaction conditions.

The present invention is intended and adapted to overcome the difficulties and disadvantages inherent in prior apparatus in the type described, it being among the objects of the present invention to provide an apparatus which permits continuous processing wherein the constituents being reacted are subjected to high temperatures for only a short time and which minimizes discoloration, decomposition or side reactions.

It is also among the objects of the present invention to provide a system which is relatively small in size, which has a large capacity the operation of which is easy to control and which permits the use of predetermined uniform conditions.

It is further among the objects of the present invention to provide an apparatus which is economical in the use of fuel, which requires relatively little labor, wherein the investment is relatively small and various operating costs are reduced.

The present invention uses a closed channel, which may have any suitable form, be it long, straight, serpentine-like or with special weirs. In the case of heterogeneous reaction mixture, this channel is combined with an agitated kettle, called a central room, where the reaction is performed until homogeneity is reached. The channel reactor and the central room may be connected in succession or joined as a unit. The relative volume of the central room to the volume of the channel reactor depends upon the respective reaction conditions. Different physical conditions may be maintained during the course of the reaction, and joint or separate condensers may be installed.

The invention will be more fully understood in connection with the accompanying drawings constituting a part hereof and in which like reference characteristics indicate like parts and in which:

Figure 1 is a vertical cross sectional view of one form of reaction vessel made in accordance with the present invention;

Figure 2 is a horizontal cross sectional view taken along line 2—2 of Figure 1;

Figure 3 is a view similar to Figure 1 showing a modified form of the invention;

Figure 4 is a horizontal cross-sectional view of the apparatus shown in Figure 3.

Referring to Figures 1 and 2, there is provided a substantially circular reaction vessel 1 having a sloping bottom 2 which is adapted to be heated. A flange 3 at the upper edge of vessel 1 carries a cover 4 held thereon by bolts 5. A series of circular baffles 6 concentrically arranged have spaces 7 therebetween and said baffles extend to the bottom 2 of vessel 1 and terminate substantially below cover 4. There is provided a central room 8 in which a stirrer or agitator 9 is located and is carried by shaft 10 extending through cover 4, the shaft being connected to a suitable source of power.

Pipes 11 and 12 provided with suitable valves or the like are provided above room 8 to permit materials to be introduced through them into vessel 1. A vapor space 13 permits gases generated in the reactions to pass out of the vessel through exit pipe 14. Pipe 15 allows the liquid contents of the vessel to flow therefrom. In spaces 7 are a series of blocks 16 as shown in Figure 2. There are also provided a series of openings 17 adjacent to the blocks. Thereby liquid flowing from room 8 passes spirally and successively through the concentric spaces as shown by arrows 18.

Referring to the modified form shown in Figures 3 and 4, there is provided a spiral baffle 20 permitting the flow of liquid from room 8 as shown by arrows 21. The outer end of spiral 20 terminates at 22 thereby causing the liquid to pass out of the vessel through pipe 15.

The operation of the apparatus will be understood in connection with a number of examples of various types of reactions which are carried out in the present apparatus, the examples being as follows:

*Example 1*

In the manufacture of ester plasticizers, such as the polyglycol-fatty acid esters, a mixture is made of such acids having 6, 8, 10 and 12 carbon atoms with the major constituent having 8 carbon atoms together with triethylene glycol in the molecular ratio of 2 to 1 with a slight excess of the mixture of acids. It is introduced into the apparatus of Figures 1 and 2 through pipe 11 into central room 8. Heat is applied to the bottom 2 of vessel 1 to raise the temperature of the contents to about 175°–185° C. Stirrer 9 is rotated and the feed of reactants together with the usual esterification catalyst is continuous. Pipe 12 is closed and the vapors generated in the reaction are removed through exit opening 14. The reaction mixture flows spirally outward as shown by arrows 18 and out through pipe 15.

The production is from 3 to 4 times that obtained in a batch kettle of about the same capacity. The time of the present operation, namely the time required for reactants to pass through the system is about four hours compared to 18 to 24 hours in the batch process. Furthermore, the quality of the product is higher and the` color is lighter, introducing a saving in the latter refining steps, including bleaching.

*Example 2*

In order to form a condensation product having detergent properties a mixture of one mol of coconut fatty acids with two mols of a mixture of ethanolamines is fed continuously into reaction vessel 1 of Figures 1 and 2 through pipe 11. Heat is applied to raise the temperature of the mixture to about 160–170° C. The procedure is as outlined in Example 1.

The time required for the reactants to pass through the reaction vessel is from 20 to 30 minutes as compared to the prior art batch process where 2 to 3 hours were required. The production is about 6 times that of a batch kettle of the same capacity. Also, the quality of the product is higher, the color is lighter and the control of the process results in uniform chemical composition of the condensation product.

*Example 3*

In order to make dibutyl phthalate, a solution of phthalic anhydride in butanol is continuously fed into reaction vessel 1 of Figures 3 and 4 through pipe 23. The proportion of butanol is in excess of two mols for each mol of the anhydride. Heat is applied in the form of hot liquid which may circulate in a water jacket surrounding vessel 1. In the reaction water is formed in the vapor state and it escapes through exit pipe 14, carrying with it some vaporized butanol. Due to the provision of a fractionating condenser (not shown) attached to exit pipe 14, the butanol is condensed and returns to the reaction vessel while the water vapor passes through the condenser and is discarded.

The reaction mass passes spirally through the vessel as shown by arrows 21, and the product leaves the system through pipe 15. The time of reaction is thirty minutes compared to a number of hours required in the batch operation and the quality of the product is superior.

*Example 4*

Into kettle 1 there are introduced through pipe 11 glycerine and through pipe 12 molten stearic acids in such proportions as to form glycerine monostearate. They are fed separately into said kettle which is directly heated by an oil bath so that the contents thereof are raised to a temperature of about 200–220° C. and agitated by stirrer 9. The constituents are not miscible and tend to separate into two layers, but they are kept intimately mixed by agitation. The reaction starts in central room 8 and the mixture becomes homogenized in a short time due to partial reaction between them. The mixture then passes through channel 7 and flows out of the apparatus through pipe 15. Vapors generated in kettle 1 are removed through exit pipe 14. The temperatures in the central room 8 of kettle 1 may be maintained at different levels.

In the prior batch process it required a considerable time for completion of the reaction, say 3 to 4 hours, whereas by the present process the reactants pass through the system in about 20 to 25 minutes. In addition, the color of the present product is considerably lighter and the quality and uniformity thereof are better. The reaction is more complete and the yield obtained is about 85 to 90% of monostearate compared to a yield of about 38 to 40% in the batch process.

By conducting this reaction in the apparatus of Figures 1 and 2, substantially better results are obtainable, particularly with respect to reduction of heat losses and in economy operation.

Various other reactions may also be conducted in the present apparatus with substantial advantages over the prior art. For instance, the reactions to form other ester plasticizers, such as dioctyl phthalate, and the rearrangement of edible fats with triglycerides of lower fatty acids, may be accomplished therein. Other technical reactions such as the production of indigo and the reconstruction of fats with higher fatty acids are contemplated herein as well as many other organic reactions.

The feeding of reaction partners and catalysts, can either be arranged separately, using a suitable feeding equipment, at any point of the reaction channel or in the aforesaid kettle or over a feeding tank with or without agitator. The apparatus allows any choice of reaction conditions, like temperature, residence time, pressure, etc. affording optimum processing and the suppression of side reaction. Besides a multiplied volume-time-yield, related with corresponding savings in manufacturing expenses and investment, products with remarkably improved qualities can be produced.

There are a number of advantages inherent in the present invention in that the apparatus has a multiplied capacity so that production is greatly increased, the product has greater uniformity and is of higher quality. Costs are substantially reduced including investment and operating expenses. For a given size of apparatus the output is many times that obtained in the batch process. The very short time at high temperatures improves the color of the finished product. The equalization of the residence time of the reaction mixture results in a uniform quality.

The invention avoids the necessity of heating up the reaction mixture and of cooling down, thereby saving heat. Because of the physical character of the apparatus particularly that shown in Figures 1 to 4 inclusive, radiation losses are reduced thereby further economizing in the use of fuel.

The channels are only partly filled so as to permit the immediate escape of vapors from the surface of the liquid. The sides of the vessels may be heated and the apparatus may be heated by jackets or coils with circulating hot liquids or vapors or steam. Heating may be electrical or by direct flame. The flow through the spirals may be from the outermost channel to the central portion. Various pressures may be used, including atmospheric and higher pressures, as well as vacuum.

While the invention has been described setting forth several specific embodiments thereof, the invention is not to be limited thereto as such examples were given for the purpose of illustration only. Therefore the invention is to be broadly construed and not to be limited except by the character of the claims appended hereto.

I claim:

1. Apparatus for conducting reactions between liquid organic acids and alcohols which comprises a closed reaction vessel, separate adjacent inlets for introduction of said acids and alcohols centrally of the top of said vessel, the bottom of said vessel being closed, means for heating said vessel, a plurality of concentric compartments in said vessel extending from the bottom thereof to a point below the top and providing a vapor space, an exit in said top for vapors, said compartments having means for communication therebetween, means for causing flow of said substances spirally from the central compartment to the outer compartment, an overflow outlet in the side of said vessel adjacent to but below the upper edge of said compartments, an agitator in said central compartment for causing mixing of said acids and alcohols as they enter the reaction vessel to render the mixture homogeneous.

2. Apparatus for conducting reactions between liquid organic acids and alcohols which comprises a closed reaction vessel, separate adjacent inlets for introduction of said acids and alcohols centrally of the top of said vessel, the bottom of said vessel being closed, means for heating said vessel, a plurality of concentric compartments in said vessel extending from the bottom thereof to a point below the top and providing a vapor space, an exit in said top for vapors, said compartments having means for communication therebetween, means for causing flow of said substances spirally from the central compartment to the outer compartment, an overflow outlet in the side of said vessel adjacent to but below the upper edge of said compartments, each of said compartments being annular, transverse blocks across said compartments, and openings in the walls of said compartments adjacent to said blocks for providing passages for the flow of liquid through successive compartments.

References Cited in the file of this patent

UNITED STATES PATENTS

| | | | |
|---|---|---|---|
| 1,036,609 | Groovenor | Aug. 27, | 1912 |
| 1,253,616 | McElroy | Jan. 15, | 1918 |
| 2,460,083 | Harbaugh | Jan. 25, | 1949 |
| 2,644,009 | Cash et al. | June 30, | 1953 |
| 2,735,839 | Schrenk | Feb. 21, | 1956 |